United States Patent [19]

Soneda et al.

[11] 4,447,812
[45] May 8, 1984

[54] LIQUID CRYSTAL MATRIX DISPLAY DEVICE

[75] Inventors: Mitsuo Soneda, Zama; Takaji Ohtsu, Hatano, both of Japan

[73] Assignee: Sony Corporation, Tokyo, Japan

[21] Appl. No.: 384,560

[22] Filed: Jun. 3, 1982

[30] Foreign Application Priority Data

Jun. 4, 1981 [JP] Japan .................. 56-86289

[51] Int. Cl.³ .............................. G09G 3/18
[52] U.S. Cl. .................... 340/784; 340/802; 340/718; 358/241
[58] Field of Search ............... 340/783, 784, 798, 802, 340/807, 765, 752, 718, 719; 358/213, 241

[56] References Cited

U.S. PATENT DOCUMENTS 3,627,924 12/1971 Fleming et al. ............... 358/241
3,883,862 5/1975 Nishizawa et al. ............ 340/825.81
4,193,095 3/1980 Mizushima .................... 358/241
4,359,729 11/1982 Nonomura et al. ............ 340/784

FOREIGN PATENT DOCUMENTS 2936059 3/1980 Fed. Rep. of Germany ...... 340/802

Primary Examiner—Gerald L. Brigance
Attorney, Agent, or Firm—Lewis H. Eslinger; Alvin Sinderbrand

[57] ABSTRACT

A liquid crystal matrix display device has a plurality of display elements arranged in an X-Y matrix pattern. Vertical transmitting lines are connected to all of the display elements of each column, and horizontal transmitting lines are connected to each of the display elements of each row. Each of the vertical lines is connected through an input switching element to an input circuit to receive a video input signal and a horizontal pulse generator provides sequential pulse signals to control terminals of the input switching elements. In order to improve the resolution without sacrifice of contrast, the vertical transmitting lines are arranged into groups of a predetermined number of such lines, and the input switching elements associated with the lines of each such group have their control electrodes coupled together to a respective output of the horizontal scanning pulse generator. The input circuit includes time-demultiplexing circuitry, for example, formed of sample/hold circuits, to present respective sampled versions of the input signal, staggered with respect to one another, to input electrodes of respective ones of the input switching devices of each of the groups.

7 Claims, 27 Drawing Figures

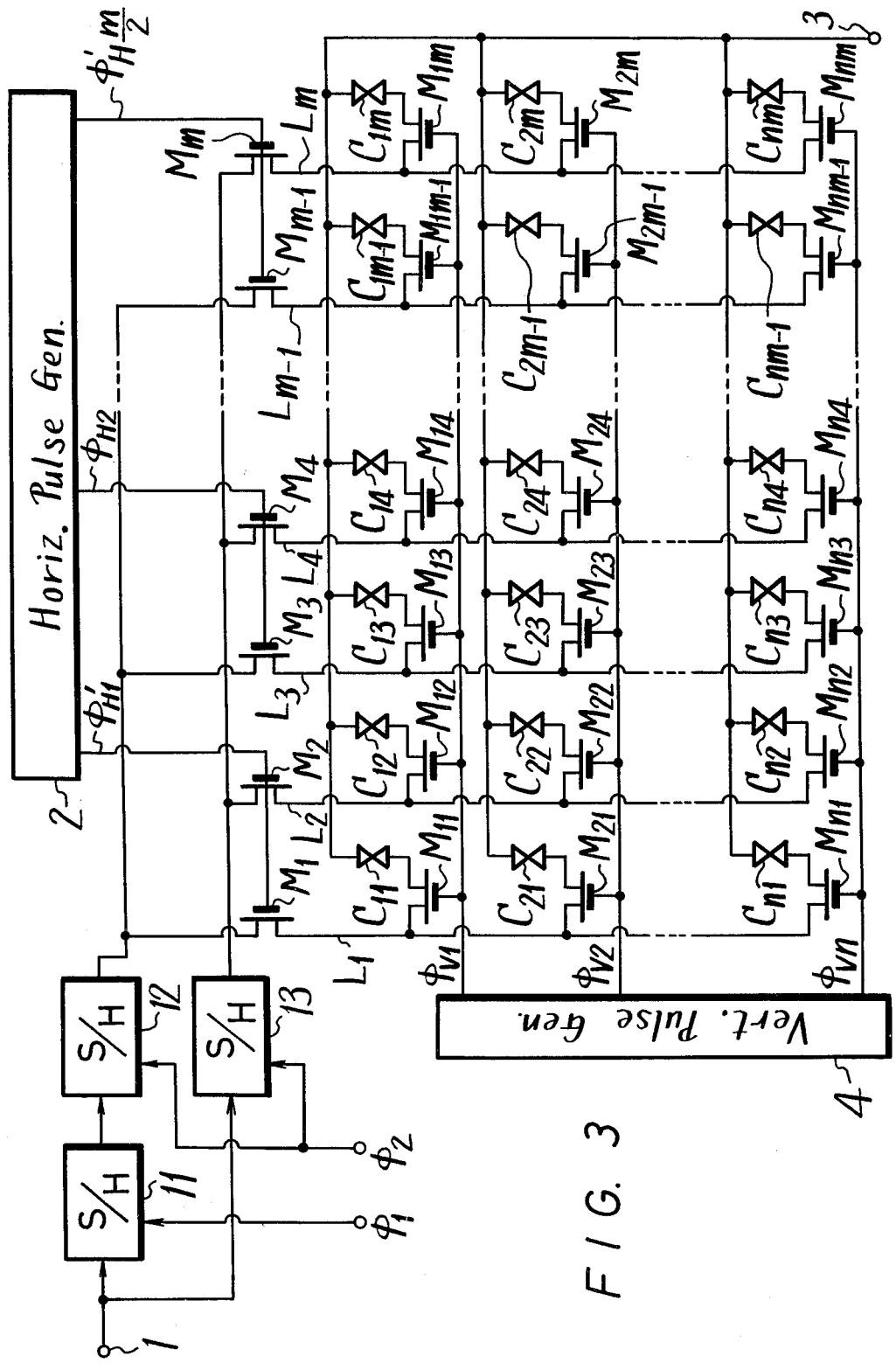
F I G. 3

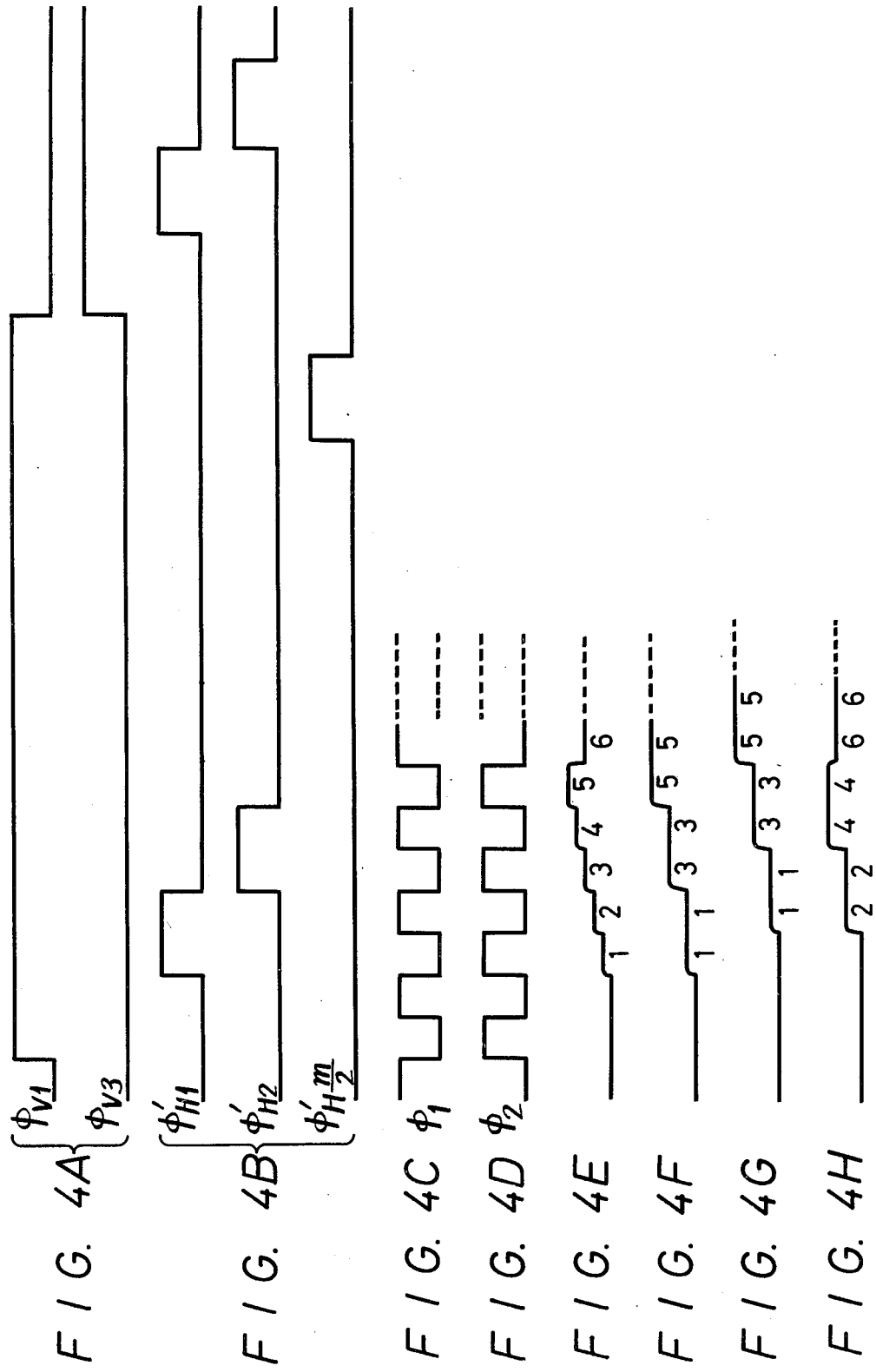

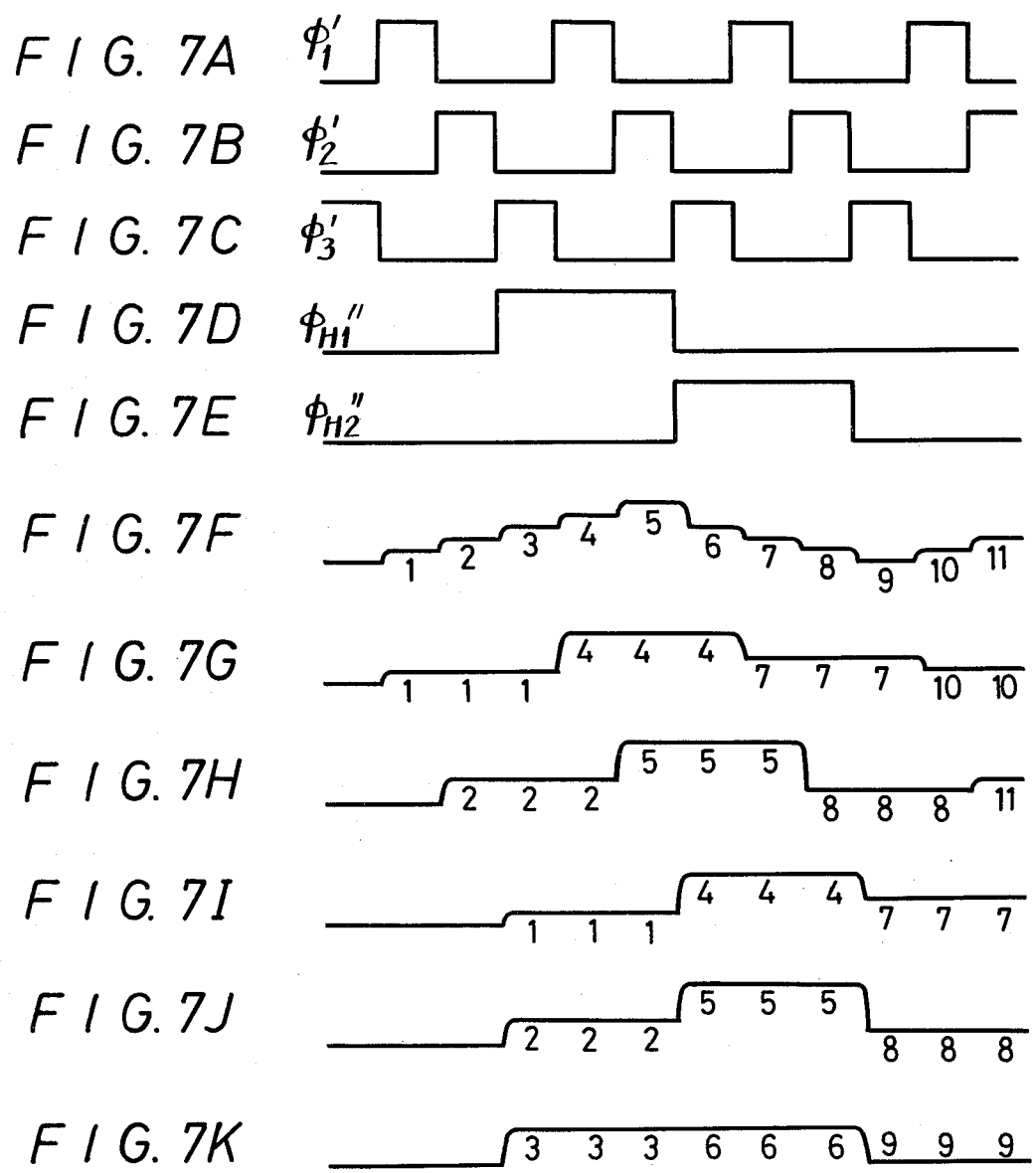

LIQUID CRYSTAL MATRIX DISPLAY DEVICE

BACKGROUND OF THE INVENTION

1. Field of the Invention

This invention relates generally to a two-dimensional address or matrix device, and is more particularly directed to a two-dimensional display device employing liquid crystals.

2. Description of the Prior Art

It has been previously proposed to display a television picture on a liquid-crystal display device. Normally, such a device employs a plurality of picture element units disposed in an X-Y array or matrix, with each picture element unit being formed of a liquid crystal cell and a switching element, which can be an FET. Generally, the picture element units are arranged in n horizontal rows and m vertical columns. A horizontal scanning pulse generator, normally formed of a shift register, has m output terminals and cycles once for each horizontal line interval of an input video signal, so each of the m outputs is high for a fraction 1/m of the picture portion of a horizontal line interval. A vertical scanning pulse generator, normally formed as a shift register, has n output terminals, and cycles once each frame interval (i.e., odd output terminals are made high in turn during odd field intervals, and even output terminals are made high in turn during even field intervals).

Vertical signal transmitting lines are respectively connected to all of the n switching elements of each column, and horizontal signal transmitting lines are respectively connected to each of the m switching elements of each row. Each of the m vertical lines is connected to an output terminal of a respective input switching element, which has an input terminal connected to a signal input to receive a video input signal and has a control electrode connected to a respective one of the m output terminals of the horizontal scanning pulse generator. The n horizontal lines are each connected to a respective one of the n output terminals of the vertical scanning pulse generator.

At any given moment, the input video signal is applied to a single one of the picture element units, namely, that one for which the horizontal and vertical scanning pulses are both high. Each of the liquid crystal cells has a signal charge imparted to it, in turn, and the optical transmissivity of each such liquid crystal cell is governed by its respective signal charge.

A new signal charge is given to each liquid crystal cell during each video frame.

The liquid crystal display device so constructed presents a video picture formed of a mosaic of these cells, each having a particular optical transmissivity as governed by the level of the video signal at the time that the associated vertical and horizontal scanning pulses are both high.

In such a device, the shift register forming the horizontal scanning pulse generator requires m successive stages, and if good resolution is required the number m must be quite high. Consequently, the shift register can require a large amount of area if the circuit is formed as an integrated circuit (IC).

Also, since the period during which each input switching element is on can be only 1/m times the horizontal line interval, each liquid crystal cell has only a brief period in which to receive its respective signal charge. It has been discovered that this period is insufficient for the cells to accumulate enough charge for a good quality, high contrast television picture. Unfortunately, the amount of transferred signal charge cannot be increased merely by increasing the video signal voltage, because the structure of the liquid crystal cells will not tolerate application of higher voltages.

Also, when the accumulated signal charges in the liquid crystal cells are low compared with the corresponding values of the input video signal, any insufficiency in charging is likely to vary significantly from one picture element unit to the next, with a result that waveform distortion can occur in the television picture.

Further, if the resistance of the switching elements of the picture element units is reduced, i.e., if the transconductance thereof is made high where FETs are used for the switching elements, each such element is required to have a large gate width. Consequently, when formed as an IC, the chip area required for the display device can become excessively large.

OBJECTS AND SUMMARY OF THE INVENTION

Accordingly, it is an object of this invention to provide a liquid crystal display device of simple structure which avoids the aforesaid defects inherent in the prior art.

It is another object of this invention to provide a liquid crystal device which avoids waveform distortion.

It is still another object of this invention to provide a liquid crystal device which can display a picture with a satisfactory picture quality and contrast.

It is a further object of this invention to provide a liquid crystal device whose chip area is reduced when the device is formed as an integrated circuit.

It is a yet-further object of this invention to provide a liquid crystal device in which power consumption can be reduced.

According to an aspect of the present invention, there is provided a liquid crystal matrix display device comprising a plurality of display elements (i.e., picture element units) arranged in X-axis and Y-axis directions to form an X-Y matrix pattern of n rows by m columns, disposed respectively in the X-axis and Y-axis directions. Each of the display elements includes a liquid crystal cell and a switching element connected therewith to supply a signal charge to the associated liquid crystal cell. An input signal is provided to a signal input circuit and is distributed to the display elements over m first transmitting lines each coupled to the n switching elements of an associated column. A plurality n of second transmitting lines are each coupled to the m switching elements of an associated row. There are also provided m input switching devices, each coupling the signal input circuit to a respective first transmitting line. A first scanning pulse generator has a predetermined number of outputs and provides sequential first scanning pulses to control electrodes of the m input switching elements, and a second scanning pulse generator provides sequential second scanning pulses to the n second transmitting lines. The display device according to this invention has the improvement wherein the m first transmitting lines are collected into groups of a predetermined plurality l of lines, such as two lines or three lines, and the input switching elements associated with the l lines of each group have their control electrodes coupled together to a respective output of the first scanning pulse generator.

This feature permits the first scanning pulse generator to be constructed of only m/l stages (i.e., m/2 or m/3 stages), and to be operated at a correspondingly lower frequency. Thus, the first scanning pulse generator can be constructed on a reduced chip area; with fewer stages, the generator will require only a fraction of the operating current required in prior art devices. Also, because of the lower frequency for the first scanning pulses, the operating current consumption can be again reduced by a similar factor.

The input circuit includes a time-demultiplexing circuit, for example, formed of a cascade arrangement of sample/hold circuits, with an input and l outputs each coupled to an input electrode of a respective one of the l switching devices of each group. The l outputs thus provide respective sampled versions of the input signal staggered with respect to each other.

The above and other objects, features, and advantages of this invention will become apparent from the ensuing description of preferred embodiments thereof, when considered in conjunction with the accompanying drawings through which the like reference characters identify the same elements and parts.

BRIEF DESCRIPTION OF THE DRAWINGS

FIG. 3 is a schematic diagram of one embodiment of a liquid crystal matrix display device according to the present invention;

FIGS. 4A through 4H are waveform diagrams used to explain the operation of the embodiment of FIG. 3;

FIGS. 7A to 7K are waveform diagrams used to explain the operation of the embodiment of FIG. 6.

DETAILED DESCRIPTION OF THE PREFERRED EMBODIMENTS

Initially, for purposes of background and to emphasize the advantages of this invention, a conventional liquid crystal television display device will be described with reference to FIG. 1.

In this conventional device, an input terminal 1, to which a video signal is applied, is connected to respective input electrodes of m switching elements $M_1$, $M_2$ ... $M_m$, each formed in this example of an n-channel field-effect transistor (FET). Each of these switching elements $M_1$, $M_2$ ... $M_m$ has an output electrode connected to a respective connected to a respective one of m transmission lines $L_1$, $L_2$, ... $L_m$, which each extend in a vertical, or Y-axis direction. Here, there are m lines $L_1$ to $L_m$ corresponding to m picture elements in the horizontal, or X-axis direction.

A horizontal pulse signal generator 2 is formed of a shift register of m stages, each with a respective signal output. This generator 2 is provided with a clock signal having a frequency substantially $mf_H$, that is, m times the horizontal scanning frequency $f_H$ of the video signal. Accordingly, the generator 2 provides scanning signals $\phi_{H1}$, $\phi_{H2}$ ... $\phi_{Hm}$ (FIG. 2B) appearing at respective output terminals thereof, to control electrodes of the respective switching elements $M_1$, $M_2$ ... $M_m$.

The device also includes an array of picture element units each formed of a liquid crystal cell $C_{11}$, $C_{12}$ ... $C_{nm}$ and an associated switching element $M_{11}$, $M_{12}$, ... $M_{nm}$. These picture element units are arranged in m columns in the vertical, or Y-axis direction and n rows in the horizontal, or X-axis direction, and the first and second indexes associated with each of the cells $C_{11}$, $C_{12}$ ... $C_{nm}$ and switching elements $M_{11}$, $M_{12}$, ... $M_{nm}$ indicate the particular row and column therefor, respectively. Here the switching elements $M_{11}$, $M_{12}$ ... $M_{nm}$ are shown to be FETs with an input electrode connected to the associated vertical line $L_1$, $L_2$ ... $L_m$ and an output electrode connected to one side of the associated liquid crystal cell $C_{11}$, $C_{12}$, ... $C_{nm}$. The other sides of the latter cells are connected to a target terminal 3 at which a target potential is applied.

A vertical pulse signal generator 4 formed of a shift register of n stages, and provided with flyback pulses as clocking pulses therefor, provides n vertical scanning signals $\phi_{V1}$, $\phi_{V2}$, ... $\phi_{Vn}$ (FIG. 2A) (first for odd lines, then for even lines) at respective outputs thereof. These signals are provided to respective horizontal transmitting lines, each connected to control electrodes of all of the switching elements of a particular row $M_{11}$ to $M_{1m}$; $M_{21}$ to $M_{2m}$; ... $M_{n1}$ to $M_{nm}$.

Figure 2:
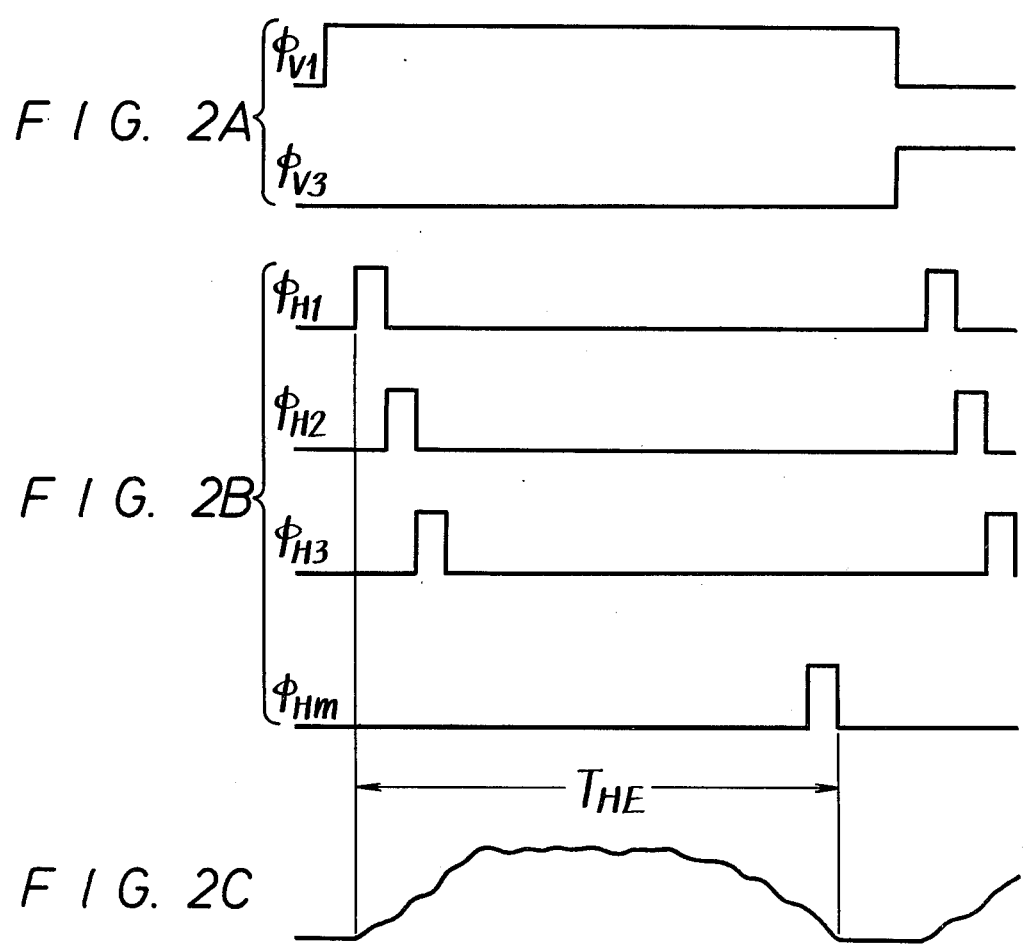
FIGS. 2A, 2B, and 2C are waveform diagrams used to explain the operation of the device of FIG. 1.

A typical horizontal interval of video information is shown in FIG. 2C.

The pulse signal generators 4 and 2 produce their respective scanning signals $\phi_{V1}$, $\phi_{V2}$ ... $\phi_{Vn}$ and $\phi_{H1}$, $\phi_{H2}$ ... $\phi_{Hm}$ as shown in FIGS. 2A and 2B, so that the vertical scanning signals $\phi_{V1}$, $\phi_{V2}$, ... $\phi_{Vn}$ appear, in alternate succession, for a period equal to one horizontal interval, and the horizontal scanning signals $\phi_{H1}$, $\phi_{H2}$, ... $\phi_{Hm}$ appear in succession with one cycle thereof $\phi_{H1}$ to $\phi_{Hm}$ occurring during an effective picture period $T_{HE}$ (FIG. 2C) of each horizontal interval.

When the scanning signals $\phi_{V1}$ and $\phi_{H1}$ are both produced by the generators 4 and 2 (i.e., both signals are high). The switching element $M_1$ is made ON to pass the video input signal to the line $L_1$, and the switching elements $M_{11}$ to $M_{1m}$ are made ON to form a current path from the input terminal 1, to the switching element $M_1$, to the vertical line $L_1$, to the switching element $M_{11}$, to the liquid crystal cell $C_{11}$, to the target terminal 3. Thus, when the signals $\phi_{V1}$ and $\phi_{H1}$ are both high, a signal charge corresponding to the electric potential difference produced by a first picture element of the video signal, is sampled by the switching elements $M_1$ and $M_{11}$ and is held by the capacitance of the liquid crystal cell $C_{11}$. This causes the optical transmissivity of the liquid crystal cell $C_{11}$ to be varied in accordance with the level of the first picture element of the video signal.

The same procedure is carried out for the remainder of the picture elements in the video signal so that each of the remainder liquid crystal cells $C_{12}$ to $C_{nm}$ has its optical transmissivity varied to correspond with the level of the respective picture element. Then, for each successive video frame, signal charges are again provided to the respective liquid crystal cells $C_{11}$ to $C_{nm}$.

The optical transmissivities of the various cells $C_{11}$ to $C_{nm}$ are varied from one picture element to another, and that of each cell $C_{11}$ to $C_{nm}$ is varied from one frame to the next, so that the device can display an effective video picture.

Figure 1:
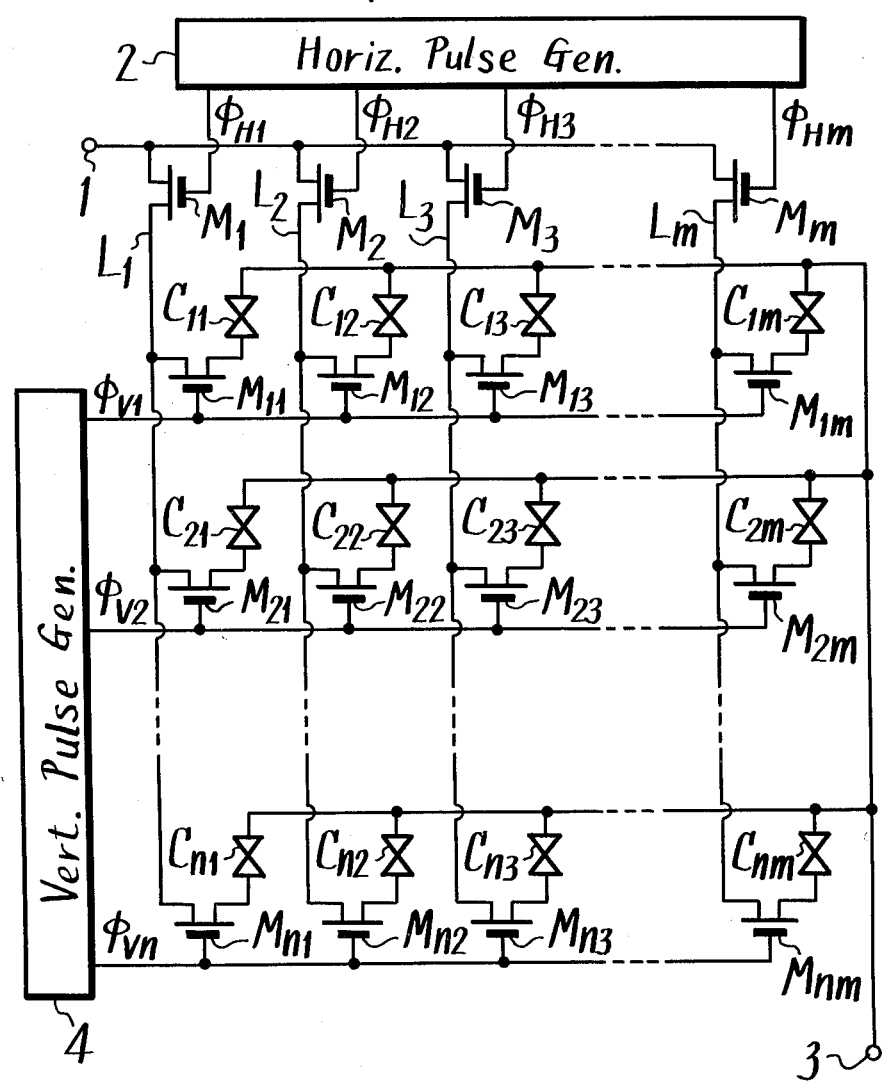
FIG. 1 is a schematic diagram of a prior-art liquid crystal matrix display device.

In the conventional device of FIG. 1, where each horizontal picture interval $T_{HE}$ has m picture elements, the shift register constituting the horizontal pulse signal generator 2 also requires m stages. Therefore, if is intended to construct a display device having high resolution, this shift register must be formed as an extremely large circuit. This circuit would perforce require an excessively large chip area, if the device is to be formed as an integrated circuit (IC).

Furthermore, each of the switching elements $M_1$ to $M_m$ is turned on for only a brief fraction of the horizontal picture interval $T_{HE}$, so that the signal charges can flow to the liquid crystal cells $C_{11}$ to $C_{nm}$ for only an extremely brief period $T_{HE}/m$. Accordingly, in the device of FIG. 1, the signal charges do not always have sufficient time to accumulate in the respective liquid crystal cells $C_{11}$ to $C_{nm}$. Moreover, it is not possible to solve this problem merely by changing the amplitude of the input video signal, because the structure of the liquid crystal cells $C_{11}$ to $C_{nm}$ limits the maximum voltage that can be applied thereto. Consequently, a video picture with high resolution and also with good contrast cannot be provided by the prior-art circuit of FIG. 1.

Still further, if the accumulated signal charges in the liquid crystal cells $C_{11}$ to $C_{nm}$ are low compared with the corresponding values of the input video signal, any insufficiency in charging of the liquid crystal cells $C_{11}$ to $C_{nm}$ is likely to vary significantly from one picture element to the next, with a result that waveform distortion can occur in the television picture. On the other hand, if it is attempted to reduce the resistance of the switching elements (i.e., to increase the source-to-drain transconductance of the FETs $M_{11}$ to $M_{nm}$) it is required to construct each such element with a large gate width. Consequently, if the device is formed as an IC, the chip area required for the display device can become excessively large.

A first embodiment of this invention is shown in FIG. 3, wherein elements in common with the device of FIG. 1 are identified with the same reference characters, and a detailed description thereof is omitted.

In FIG. 3, the vertical lines $L_1, L_2, \ldots L_m$ are respectively grouped so as to form pairs of lines $L_1, L_2; L_3, L_4; \ldots L_{m-1}, L_m$. The control electrodes of the switching elements $M_1, M_2; M_3, M_4; \ldots M_{m-1}, M_m$ associated with each such group are connected together, and are also connected to a respective output terminal of the horizontal pulse signal generator 2. The input terminal 1 supplies the video input signal to a time demultiplexing circuit, here formed of sample/hold circuits 11, 12, and 13, to distribute the input video signal alternately to the first switching element $M_1, M_3, \ldots M_{m-1}$ and to the second switching element $M_2, M_4, \ldots M_m$ of each pair of switching elements.

The first and third sample/hold circuits 11 and 13 have their input terminals coupled to the signal input terminal 1, and the input terminal of the second sample/hold circuit 12 is coupled to an output terminal of the first sample/hold circuit 11. The second and third sample/hold circuits 12 and 13 have their output terminals coupled to the input electrodes of the first switching elements $M_1, M_3, \ldots M_{m-1}$, and to the input electrodes of the second switching elements $M_2, M_4, \ldots M_m$, respectively. The first sample/hold circuit 11 has a clock input coupled to receive a clock pulse signal $\phi_1$, while the second and third sample/hold circuits 12 and 13 have clock inputs coupled to receive another clock signal $\phi_2$.

The horizontal pulse signal generator 2 requires only half the output terminals of the corresponding generator 2 of FIG. 1, each providing a horizontal scanning pulse signal $\phi'_{H1}, \phi'_{H2},$ and $\ldots \phi'_{Hm/2}$, each of which is high for a period of two picture elements.

That is, during the period of the vertical scanning pulse signals $\phi_{V1}, \phi_{V3} \ldots$ (FIG. 4A) a cycle of m/2 horizontal scanning pulse signals $\phi'_{H1}, \phi'_{H2} \ldots \phi'_{Hm/2}$ (FIG. 4B) is produced. At the same time, the first sample/hold circuit 11 is provided with the one clock signal $\phi_1$ (FIG. 4C) which is high during alternate picture elements and is low during the remaining picture elements, and the second and third have sample/hold circuits 12 and 13 are provided with the other clock signal $\phi_2$ which has the same frequency as the one clock signal $\phi_1$, but which has an opposite phase. In the circuit of this embodiment, if an input signal as shown in FIG. 4E is applied to the signal input terminal 1, the first sample/hold circuit 11 samples the above video input signal when the one clock signal $\phi_1$ is high so as to form a sampled signal as shown in FIG. 4F. The sample/hold circuit 12 samples the above sampled signal to form a delayed sampled signal as shown in FIG. 4G. Also, in response to this other clock signal $\phi_2$, the third sample/hold circuit 13 samples the above video input signal so as to form the sampled signal as shown in FIG. 4H.

Accordingly, the first lines $L_1, L_3, \ldots L_{m-1}$ of each of the groups of two lines are supplied with the delayed sampled signal of FIG. 4G, and the remaining lines $L_2, L_4 \ldots L_m$ are supplied with the sampled signal of FIG. 4H, each of which has a substantially constant level for a period of two successive picture elements. At the same time, the switching elements $M_1$ to $M_m$ are turned on for periods of two picture elements in synchronism with the timing of the clock signal $\phi_2$. Consequently, a demultiplexed video signal is applied to the odd and even vertical lines $L_1$ to $L_m$, respectively.

When the scanning signals $\phi'_{H1}$ (FIG. 4B) and $\phi'_{V1}$ (FIG. 4A) are both high, the switching elements $M_1$ and $M_2$ of the first group are turned on, and the switching elements $M_{11}$ to $M_{1m}$ of the first row of picture element units are also turned on to form a current path from the sample/hold circuit 12 to the first switching element $M_1$, to the first line $L_1$, to the first switching element $M_{11}$ of the first row, to the liquid crystal cell $C_{11}$ associated therewith, and thence to the target terminal 3; and also from the sample/hold circuit 13 to the second switching element $M_2$, to the second line $L_2$, to the second switching element $M_{12}$ of the first row, to the liquid crystal cell $C_{12}$ associated therewith, and thence to the target terminal 3. The signal charges corresponding to the sampled signal level in the first and second picture elements are then sampled and held in the liquid crystal cells $C_{11}$ and $C_{12}$, respectively. Consequently, the optical transmissivity of these liquid crystal cells $C_{11}$ and $C_{12}$ is changed in accordance with the amount of signal charge accumulated therein.

Thereafter, the same process is carried out, in turn, to apply the signal charges to the remaining liquid crystal cells $C_{13}$ to $C_{nm}$. Then, during the next video frame, new signal charges are provided to the respective liquid crystal cells $C_{11}$ to $C_{nm}$, so that an effective video picture is displayed.

In this embodiment, because the video signals are supplied to the respective liquid crystal cells $C_{11}$ to $C_{nm}$ for a period of two picture elements, that is, for a duration of time twice as long as that of the conventional display device of FIG. 1, sufficient signal charge accumulates in each of the liquid crystal cells $C_{11}$ to $C_{nm}$. Consequently, with the device of this invention the problem of waveform distortion is obviated, and it is possible to display a video picture having both high resolution and strong contrast.

Furthermore, because the number of stages of the shift register forming the horizontal pulse signal generator 2 is reduced to one half the number of stages required in the conventional device of FIG. 1, the circuit arrangement of this embodiment becomes comparatively simple, and, when the device is formed as an IC, the required chip area and the required current consumption are both reduced.

In fact, the current consumption of the pulse generator 2 is generally in proportion to the frequency of the clock signal applied thereto, as well as being proportional to the number of stages thereof. Thus, in the embodiment of this invention shown in FIG. 3, where the applied clock frequency and the number of stages are both reduced to one half, the current comsumption of the horizontal pulse signal generator 2 is reduced to one quarter that of the device of FIG. 1.

In addition, because the signal charge is applied to the liquid crystal cells $C_{11}$ to $C_{nm}$ over a relatively long time, any influence of the resistance of the switching elements is decreased. Thus, it is unnecessary to provide the switching elements $M_1$ to $M_n$ and $M_{11}$ to $M_{nm}$ with large gate widths, thereby further reducing the area occupied by the switching elements.

Furthermore, the sample/hold circuits 11, 12, 13 of this embodiment can be of quite simple construction, and therefore consume an insignificant amount of current as compared to the horizontal pulse signal generator 2. Thus, any increase in current consumption attributable to the sample/hold circuits 11, 12, and 13 will be insignificant as compared to the savings in current comsumption in the horizontal pulse signal generator 2.

Figure 5B:
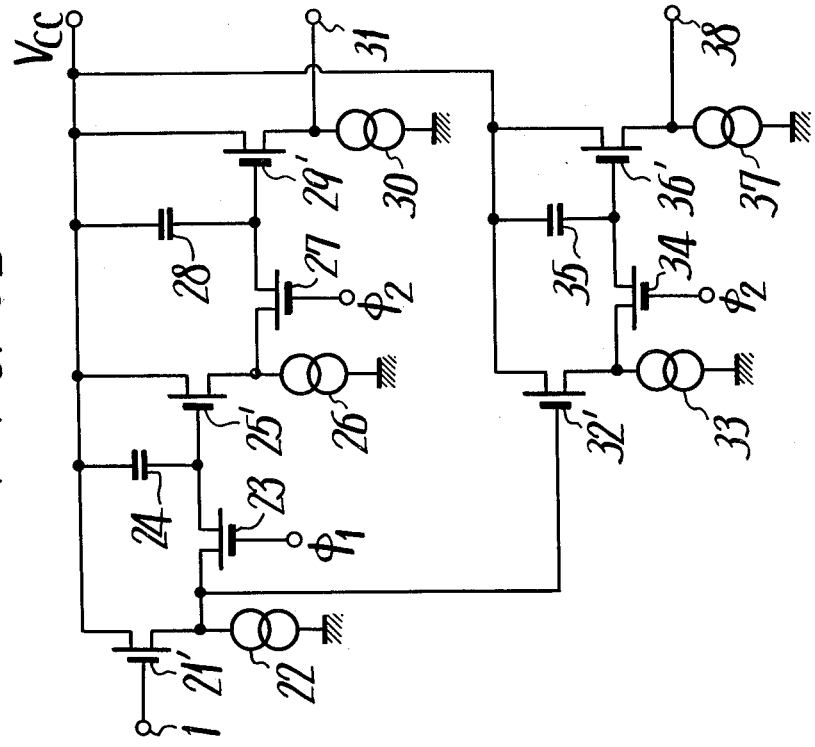
FIGS. 5A and 5B are circuit diagrams showing a practical sample-and-hold circuits which can be employed in the embodiment of FIG. 3.
Figure 5A:
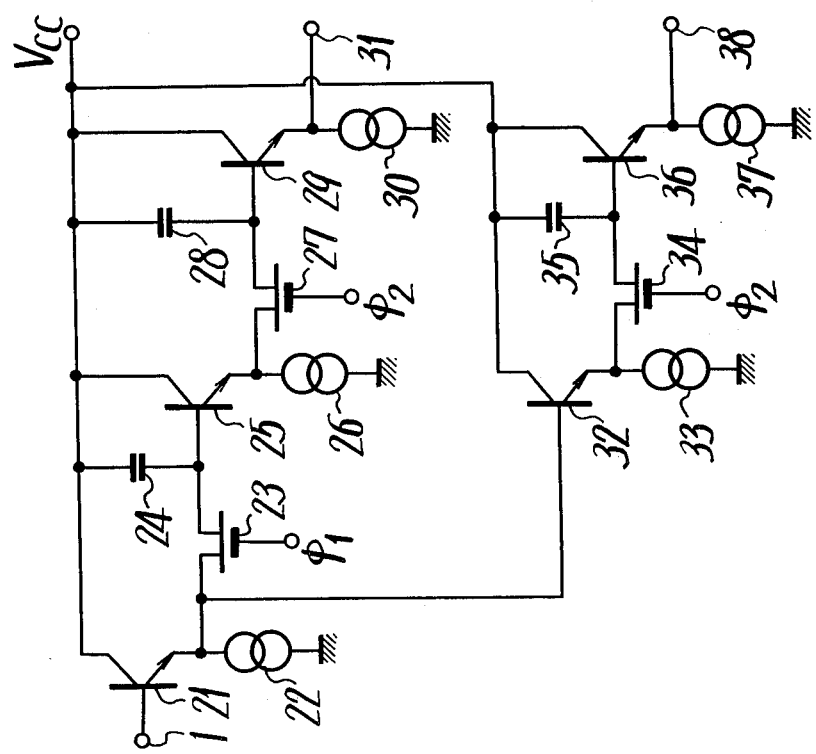

Practical examples of the sample/hold circuits 11 to 13 are illustrated in FIGS. 5A and 5B.

In the example shown in FIG. 5A, the input terminal 1 is connected to the base of a junction transistor 21 whose collector is connected to a source of potential $V_{cc}$, and whose emitter is connected, through a constant current source 22, to ground. The emitter of the transistor 21 is also connected through a switching element 23, to which the one clock signal $\phi_1$ is applied, to one plate of a capacitor 24, whose other plate is connected to the potential $V_{cc}$. The one plate of this capacitor 24 is connected to the base of another transistor 25, whose collector is connected to the potential $V_{cc}$, and whose emitter is coupled, through the constant current source 26, to ground. The emitter of this transistor 25 is connected, through a switching element 27 to which the other clock signal $\phi_2$ is applied, to one plate of a capacitor 28, whose other plate is connected to the potential $V_{cc}$. The one plate of this capacitor 28 is connected to the base of another transistor 29, whose collector connected to the potential $V_{cc}$, and whose emitter is coupled, through a constant current source 30, to ground. The emitter of this transistor 29 is also connected to a first output 31.

The emitter of the transistor 21 is also connected to the base of a further transistor 32, whose collector is connected to the potential $V_{cc}$, and whose emitter is connected to ground through a constant current source 33, and is also connected, through a switching element 34, to which the other clock signal $\phi_2$ is applied, to one plate of a capacitor 35, whose other plate is connected to the potential $V_{cc}$. The one plate of this capacitor 35 is connected to the base of a transistor 36, whose collector is connected to the potential $V_{cc}$, and whose emitter is connected to ground through a constant current source 37 and is also connected to another output terminal 38.

It should be appreciated that the elements 21-26 of this sample hold circuit generally constitute the first sample/hold circuit of the FIG. 3 embodiment, while the elements 27-31 and the elements 32-38 constitute the second and third sample/hold circuits 12 and 13, respectively.

In the circuit shown in FIG. 5A, the output terminal 31 is connected to the odd numbered switching elements $M_1, M_3, \ldots M_{m-1}$, to provide the delayed sampled signal of FIG. 4G, while the output terminal 38 is connected to the even-numbered switching elements $M_2, M_4, \ldots M_m$ to supply thereto the sampled signal as shown in FIG. 4H.

It is apparent that when the clock signal $\phi_1$ is supplied to the control terminal of the switching element 23 and when the clock signal $\phi_2$ is applied to the control terminal of the switching elements 27 and 34, the sample/hold circuits 11, 12, and 13 operate as described above.

In this example, because all of the elements are connected together to the same source of potential $V_{cc}$, any DC potential fluctuations from the input terminal 1 to the output terminals 31 and 38 will both be of like amount, so that in the sampled signals there appears no signal distortion attributable to the operation of the sample/hold circuits 11, 12, and 13.

FIG. 5B shows a second practical example of the sample/hold circuits 11, 12, and 13, in which like elements are identified with the same reference numbers, and a detailed description thereof is omitted. In the circuit of FIG. 5B, N-channel FETs 21', 25', 29', 32', and 36' are used in substitution for the junction transistors 21, 25, 29, 32, and 36 of the circuit of FIG. 5A. The construction shown in FIG. 5B is especially suitable if the entire circuit is to be integrated as an LSI (large scale integrated circuit).

Further, the invention is not limited to the embodiment of FIG. 3, wherein the lines $L_1$ to $L_m$ are collected into pairs, but can, more generally, be arranged with the transmitting lines $L_1$ to $L_m$ collected into groups of any predetermined plurality l of successive such lines. In such case, the input switching elements associated with the first transmitting lines of each of such groups have their control electrodes coupled together to a respective one of m/l outputs of the horizontal pulse signal generator 2, and time-demultiplexing circuitry is provided for demultiplexing the input signal and distributing the same over a plurality l of outputs presenting respective sampled versions of the input signal staggered with respect to one another to the first through lth switching elements $M_1$ to $M_m$ of each group thereof.

In the embodiment shown in FIG. 3, where l equals two, each group is formed of two lines $L_1$ to $L_m$, and the horizontal pulse signal generator 2 has m/2 outputs.

Figure 6:
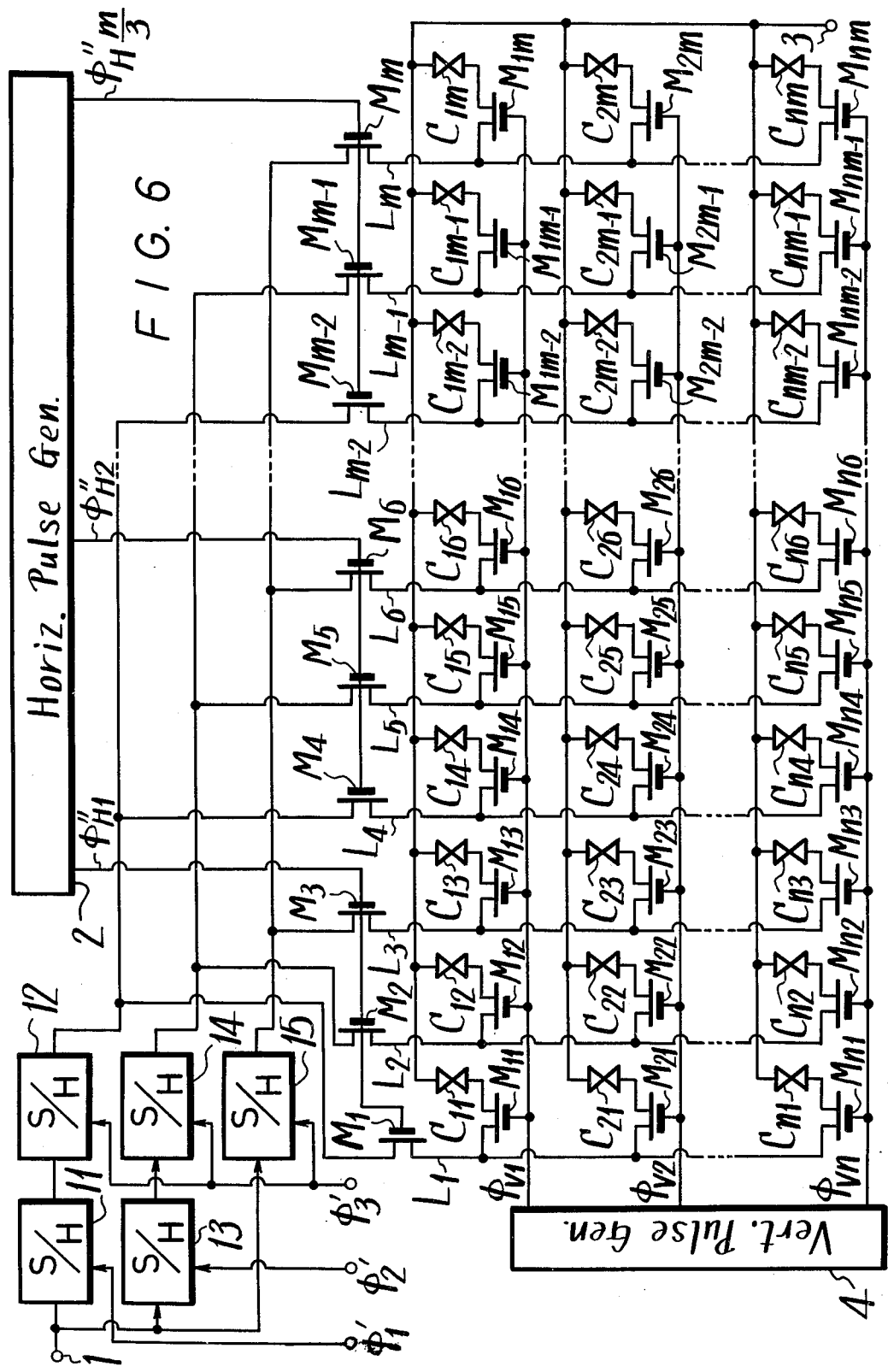
FIG. 6 is a schematic diagram of another embodiment of the liquid crystal matrix display device according to the present invention.

Another embodiment of this invention is shown in FIG. 6, in which similar elements are identified with the same reference characters, and a detailed description thereof is omitted.

In this embodiment, the transmitting lines $L_1$ to $L_m$ are collected into groups of three lines $L_1, L_2, L_3$; $L_4, L_5, L_6$; $\ldots L_{m-2}, L_{m-1}, L_m$, and there are provided first through fifth sample/hold circuits 11, 12, 13, 14, and 15. The first, third, and fifth sample/hold circuits 11, 13, and 15 have input terminals coupled to receive the input video signal. The second sample/hold circuit 12 has an input coupled to the output of the first sample/hold circuit 11, and the fourth sample/hold circuit 14 has an input coupled to the output of the third sample/hold circuit 13. The first sample/hold circuit 11 has a clock input coupled to receive a first clock signal $\phi'_1$, the third sample/hold circuit 13 has a clock input coupled to receive a second clock signal $\phi'_2$, and the second, fourth, and fifth sample/hold circuits 12, 14, and 15 have clock inputs coupled to receive a third clock signal $\phi'_3$. The second, fourth, and fifth sample/hold circuits 12, 14, and 15 have output terminals coupled to input electrodes of a first switching device $M_1, M_4, \ldots M_{m-2}$, a second switching device $M_2, M_5, \ldots M_{m-1}$, and a third switching device $M_3, M_6, \ldots M_m$ of the three input switching devices of each of the groups thereof, respectively. In this embodiment, the first, second, and third clock signals $\phi'_1$, $\phi'_2$, and $\phi'_3$ have the same frequency, but have first, second, and third phases, as shown in FIGS. 7A, 7B, and 7C, respectively. These clock signals $\phi'_1$ to $\phi'_3$ are high, in turn, for a period equal to one picture element, and are then low for a subsequent period equal to two picture elements.

At the same time, the horizontal pulse signal generator two provides horizontal scanning pulses $\phi_{H1}''$, $\phi''_{H2}$ ..., as shown in FIGS. 7D and 7E, which are high for successive periods of three picture elements.

In the embodiment of FIG. 6, if the video input signal appearing at the signal input 1 has a form as shown in FIG. 7F, the first and third sample/hold circuits will sample the video signal to provide sampled signals as shown in FIGS. 7G and 7H. These sampled signals will be transferred to the second and fourth sample/hold circuits respectively, to provide the delayed sampled circuits shown in FIGS. 7I and 7J, respectively. At the same time, the fifth sample/hold circuit 15 samples the video signal to provide the sampled signal shown in FIG. 7K. The sampled signals of FIGS. 7I, 7J, and 7K are provided to the first, second, and third lines, respectively, of each of the groups of transmitting lines $L_1$ to $L_m$.

It should be apparent that in the embodiment of FIG. 6, the horizontal pulse signal generator 2 requires only one third the stages of the similar pulse signal generator 2 of FIG. 1, so that the current consumption thereof can be reduced by a factor of nine. It is also possible, instead of reducing the number of stages in the horizontal pulse signal generator 2, to provide an increased number of picture element units, so that the horizontal resolution can be significantly increased without any reduction in picture contrast.

If the number 1 of lines forming a group is further increased, it is possible to decrease the number of stages required in the shift register constituting the horizontal pulse signal generator 2. However, if the size and construction of the sample/hold circuits in the demultiplexing circuitry is increased, the chip area required for such sample/hold circuits is increased, and the probability of distortion being introduced to the video signal is also increased. Therefore, it is preferred to limit the number of lines within each group to a small number, such as two or three.

Still further, it should be understood that the sample/hold circuit 11 in FIG. 3 could easily be replaced by a delay circuit having a delay time corresponding to one picture element (i.e., one period of the clock signal $\phi_1$). Such a delay circuit should have an input/output gain of 0 dB and a delay time of $T_{HE}/m$. That is, the delay circuit should have a transfer function which can be expressed as $$e^{-j2\pi f(T_{HE}/m)}$$

where f is the frequency of the clock signal $\phi_1$.

Still further, if it is desired to increase the number of lines $L_1$ to $L_m$ within any one group, a similar result can be achieved by providing parallel delay circuits having respective delay times of one clock period, two clock periods, etc., respectively.

In other words, a plurality l of sample/hold circuits can be provided with a clock terminal coupled to receive clock signals of a predetermined period. One of the sample/hold circuits has an input coupled to the signal input 1 to receive the input signal, whereas delay circuits are interposed between the signal input 1 and the input terminals of each of the other of the 1 sample/hold circuits to impart respective delays of 1/l to (l-1)/l times the period of the clock signal. In fact, it is apparent that the sample/hold circuits 11 and 13 of FIG. 6 function as such delay circuits.

If such delay circuits are employed, the probability that waveform distortion will occur, such as is possible in sample/hold circuits, is considerably reduced. Thus, if such delay circuits are used, it is possible to provide an embodiment of this invention having a large number of lines for each group.

Of course, the present invention is not limited to the television display device as described above, but can also be embodied in a memory device having a two-dimensional matrix address, or in many similar devices.

While preferred embodiments of this invention have been described in detail hereinabove, it is to be understood that the invention is not limited to those precise embodiments, and that many modifications and variations thereof are possible without departure from the scope and spirit of this invention, as defined in the appended claims.

We claim:

1. A liquid crystal matrix display device comprising a plurality of display elements arranged in X-axis and Y-axis directions as an X-Y matrix pattern of a predetermined number n of rows of said display elements, each such row extending in the X-axis direction and containing a predetermined number m of said display elements arranged in respective columns extending in the Y-axis direction, with each such display element including a liquid crystal cell and a switching element connected therewith to supply a signal charge to the associated liquid crystal cell; input means receiving an input signal to be distributed to said display elements; a plurality of said predetermined number m of first transmitting lines each coupled to the n switching elements of each said column; a plurality of said predetermined number n of second transmitting lines each coupled to the m switching elements of each said row; a plurality of said predetermined number m of input switching devices each having an input electrode coupled to said input means, an output electrode coupled to a respective one of said m first transmitting lines, and a control electrode; first scanning pulse generator means having a predetermined number of outputs providing sequential first scanning pulses for said m input switching elements; and second scanning pulse generator means providing sequential second scanning pulses to said n second transmitting lines; wherein said m first transmitting lines are arranged into groups of a predetermined plurality l of successive such lines, and the input switching elements associated with the first transmitting lines of each such group have their control electrodes coupled together to a respective one of the outputs of said first scanning pulse generator means; and wherein said input means includes time-demultiplexing means having an input receiving said input signal and a plurality $l$ of outputs simultaneously presenting different respective sampled versions of said input signal which represent the video signal at times staggered with respect to one another, with each of said $l$ outputs being coupled to the input electrode of a respective one of the input switching devices of each of said groups.

2. A liquid crystal matrix display device according to claim 1, wherein $l$ equals two, so that each said group is formed of two lines, and said first scanning pulse generator means has m/2 outputs, each connected to the control electrodes of the two input switching devices associated with the two first transmitting lines of a respective one of said groups.

3. A liquid crystal matrix display device according to claim 2, wherein said demultiplexing means includes first, second, and third sample/hold circuits each having an input terminal, an output terminal, and a clock terminal; the input terminals of the first and third sample/hold circuits are coupled to receive said input signal; the input terminal of the second sample/hold circuit is coupled to the output terminal of the first sample/hold circuit; the output terminals of the second and third sample/hold circuits are coupled to the input electrodes of one and the other of the input switching devices of each of said groups, respectively; the clock input of the first sample/hold circuit receives a clock pulse signal of a predetermined frequency and phase; and the clock inputs of the second and third sample/hold circuits receive a clock signal of said predetermined frequency but of an opposite phase.

4. A liquid crystal matrix display device according to claim 1, wherein $l$ equals three so that each said group is formed of three lines and said first scanning pulse generator means has m/3 outputs, each connected to the control electrodes of the three input switching devices associated with the three first transmitting lines of a respective one of said groups.

5. A liquid crystal matrix display device according to claim 4, wherein said demultiplexing means includes first, second, third, fourth, and fifth sample/hold circuits, each having an input terminal, an output terminal, and a clock terminal; the input terminals of the first, third, and fifth sample/hold circuits are coupled to receive said input signal; the input terminals of the second and fourth sample/hold circuits are coupled to the output terminals of the first and third sample/hold circuits, respectively; the output terminals of the second, fourth, and fifth sample/hold circuits are coupled to the input electrodes of a first, a second, and a third of the three input switching devices of each of said groups, respectively; the clock terminal of the first sample/hold circuit receives a first clock signal of a predetermined frequency and a first phase; the clock terminal of the third sample/hold circuit receives a second clock signal of said predetermined frequency and a second phase; and the clock terminals of the second, fourth, and fifth sample/hold circuits all receive a third clock signal of said predetermined frequency and of a third phase.

6. A liquid crystal matrix display device according to claim 1, wherein said input means includes a plurality $l$ of sample/hold circuits each having a clock terminal, an input terminal, and an output terminal coupled to a respective one of the input electrodes of the $l$ input switching devices of each said group, with said clock terminals receiving clock signals of a predetermined period, and with one of said sample/hold circuits having its input electrode coupled to a signal input to receive said input signal; and delay means interposed between said signal input and the input terminals of each of the others of said $l$ sample/hold cicuits imparting a delay of a respective predetermined fraction of said predetermined period.

7. A liquid crystal matrix display device according to claim 6, wherein said delay means imparts a respective delay or delays of from 1/$l$ to ($l$-1)$l$ times said predetermined period.

* * * * *